Patented Sept. 21, 1948

2,449,631

UNITED STATES PATENT OFFICE 2,449,631

OIL COMPOSITION

John C. Zimmer, Union, and Raphael Rosen, Elizabeth, N. J., assignors to Standard Oil Development Company, a corporation of Delaware No Drawing. Application October 18, 1945, Serial No. 623,186

6 Claims. (Cl. 252—58)

The present invention relates to spumiferous compositions of matter containing foam depressing agents, and more particularly the invention is concerned with lubricating oils, compounded lubricants, fluid greases, and other related compositions such as hydraulic oils, shock absorber oils and the like, incorporating a small amount of anti-foaming agent.

The formation of foam is distinctly disadvantageous under many circumstances, as, for example, in engine oils for internal combustion engines, gear oils, greases and particularly the heavy duty type of oils containing various compounding agents many of which enhance the tendency to foam. Heavy duty oils may contain various metallo-organic additives such as metal phenates, phenol sulfides, carboxylates, sulfonates, alcoholates, phosphates, phosphites, thio phosphates and phosphites, borates, etc., which usually promote foaming of the oil. Engine oils may also contain organic materials such as phosphatides, esters, thickeners, etc. which may contribute to the foaming of the lubricant under certain conditions. Many internal combustion engines employ both pressure and splash system of lubrication, whereas other motors use only one of the systems. In either case the formation of foam on top of the oil during the operation of the motor leads to serious consequences due to lack of lubrication. This is particularly so in lubricating systems employing the so-called "dry sump" operation where the oil returning from the engine parts is picked up by a scavenging pump and returned to the lubricant reservoir. Since the scavenging pump normally has a capacity of several times the volume of the oil returning from the engine, a large amount of air is pumped along with the lubricant and as a result foam tends to build up in the oil reservoir to a point where some oil may be lost through the breather pipe or to a point where the pressure pump delivers foam instead of oil to the various moving parts of the engine, with a resultant lack of proper lubrication. In the case of gear lubricants, such as those designed for the lubrication of automobile rear ends and transmissions when such lubricants show a marked tendency to form foam during use, the foam entraps the lubricant to such an extent that the oil level will fall below the gear train.

Hydraulic oils and shock absorber oils likewise need protection against foaming. High pressure hydraulic systems are composed of three essential elements, an oil reservoir, a high pressure accumulator and a hydraulic cylinder. During normal operation oil is pumped from the oil reservoir to the high pressure accumulator where it is held under pressure usually by means of compressed air. The oil is then released as needed directly to the hydraulic cylinder. In the reverse operation of the hydraulic cylinder, oil is released directly into the oil reservoir. Due to the sudden release in pressure, the air which was either dissolved in or forced into the oil at the high pressure existing in the accumulator, escapes from the oil, creating a froth or foam on the surface of the oil. In those cases where this foam is of a persistent character such as to eventually interfere with the proper operation of the machine, it is necessary at certain intervals to replace the froth or foam with new oil. Troublesome foaming also occurs in the hydraulic and shock absorber equipment of airplanes when such aircraft operate at high altitudes due to the fact that the greatly reduced air pressure at higher altitudes permits the air dissolved in the oil at ground level to be released. It is therefore apparent that the presence of an antifoaming agent in hydraulic media would serve a useful purpose.

The principal object of the present invention is to provide oleaginous compositions for lubrication, transfer media for heat or pressure or power or other purposes which will not froth or foam during use. The oleaginous material may be a hydrocarbon oil, a fatty oil of vegetable, animal or mineral origin or a fatty acid, alcohol or the like, normally tending to foam. This and other objects will be apparent to those skilled in the art upon reading the following description.

It has now been found that polymeric derivatives of chloro-fluorinated organic compounds, particularly those derived from unsaturated aliphatic hydrocarbons in which the major portion of the hydrogen or even all of it has been replaced with chlorine or fluorine will when added to spumiferous compositions reduce to negligible proportions the tendency of such compositions to form foam when reduced in volume by means of heat and will also when present in small amounts materially depress foaming due to aeration or deaeration in oleaginous compositions of matter.

The polymerized chloro-fluorinated olefin derivatives may be added to the oleaginous compositions at any stage of their manufacture or may be incorporated with one or more of the additives prior to the addition of the additive or mixture of additives to the oily material to form the lubricant, as, for instance, along with ft./hr., while maintaining temperature at 75° F. The amount of foam produced was 50 cc. on a 2000 cc. sample, and it was found that the foam broke after about 2 minutes. As a comparative test the oil to which none of the polymer was added was likewise treated under the same conditions. This time 550 cc. of foam was produced and it took 9 minutes to break.

What we claim is:

1. A composition of matter consisting essentially of an oleaginous vehicle with a tendency to foam during processing, use or manufacture, and 0.0001 to 10% by weight of a foam inhibiting additive consisting essentially of a liquid non-volatile polymer of a chloro-fluoro substituted olefin of 2 to 10 carbon atoms, said polymer containing 10 to 50 carbon atoms per molecule and having a major part of its normal hydrogen content replaced with said halogens.

2. Composition according to claim 1 in which the polymer is a fluid polymer of low volatility and is present in from .001 to 10% of the vehicle.

3. Composition of matter consisting essentially of an oleaginous vehicle and from .001 to 10% of liquid low volatility polymer of trichloro-trifluoro propene, said polymer having not less than 10 and not more than 50 carbon atoms per molecule.

4. Composition of matter consisting essentially of an oleaginous vehicle and from .001 to 10% of liquid low volatility polymer of trifluor-mono chlor ethylene, said polymer having not less than 10 and not more than 50 carbon atoms per molecule.

5. Composition according to claim 3 in which the oleaginous vehicle is a hydrocarbon.

6. Composition according to claim 3 in which the oleaginous vehicle is a fatty oil.

JOHN C. ZIMMER.
RAPHAEL ROSEN.

REFERENCES CITED

The following references are of record in the file of this patent:

UNITED STATES PATENTS

| Number | Name | Date |
|---|---|---|
| 2,298,833 | Muessig | Oct. 13, 1942 |
| 2,316,684 | Gaylor | May 11, 1943 |
| 2,398,596 | Davis | Feb. 12, 1946 |

OTHER REFERENCES

Glyco Products Company, articles in Drugs, Oils and Paints, vol. 46, #9, page 330.

Ross et al., articles in Ind. Eng. Chem., vol. 36, #6, pages 570–573, June 1944.